US006859690B2

(12) United States Patent
Asher et al.

(10) Patent No.: US 6,859,690 B2
(45) Date of Patent: Feb. 22, 2005

(54) METHOD FOR USING GPS AND CROSSLINK SIGNALS TO CORRECT IONOSPHERIC ERRORS IN SPACE NAVIGATION SOLUTIONS

(75) Inventors: Mark S. Asher, Ellicott City, MD (US); Eric A. Olsen, Clarksville, MD (US); Patrick A. Stadter, Mt. Airy, MD (US)

(73) Assignee: The Johns Hopkins University, Baltimore, MD (US)

( * ) Notice: Subject to any disclaimer, the term of this patent is extended or adjusted under 35 U.S.C. 154(b) by 196 days.

(21) Appl. No.: 10/383,320

(22) Filed: Mar. 7, 2003

(65) Prior Publication Data

US 2003/0176972 A1 Sep. 18, 2003

Related U.S. Application Data (60) Provisional application No. 60/363,805, filed on Mar. 13, 2002.

(51) Int. Cl.[7] ............................................... G06F 7/00
(52) U.S. Cl. ...................... 701/13; 701/213; 701/214; 342/357.02; 342/357.06; 342/357.12
(58) Field of Search .......................... 701/3, 4, 13, 213, 701/214, 215, 226; 702/2, 66; 342/352, 356, 358, 357.01–357.12, 357.16; 455/12.1, 13.4, 427, 428; 370/277, 382; 709/217, 227

(56) References Cited

U.S. PATENT DOCUMENTS

| | | | | |
|---|---|---|---|---|
| 5,490,076 A | * | 2/1996 | Rawicz et al. ................ 455/98 |
| 5,982,323 A | * | 11/1999 | Czichy ................... 342/357.01 |
| 6,462,707 B1 | * | 10/2002 | Clark ..................... 342/357.06 |
| 6,603,426 B1 | * | 8/2003 | Clark ..................... 342/357.06 |
| 6,606,560 B1 | * | 8/2003 | Clark .......................... 701/213 |
| 6,721,658 B2 | * | 4/2004 | Stadter et al. .............. 701/213 |
| 6,782,330 B1 | * | 8/2004 | Clark ........................... 702/66 |

* cited by examiner

Primary Examiner—Richard M. Camby
(74) Attorney, Agent, or Firm—Albert J. Fasulo, II (57) ABSTRACT

A method of correcting ionospheric delays induced in received signals by space systems is disclosed. The method takes advantage of received GPS signals and received crosslink signals among spacecraft to estimate the effect of ionospheric delays and correct for such delays in the computation of the range estimation between spacecraft. The method generates and initial estimate of the ionospheric delay by tracking pseudorandom codes on both GPS and crosslink signals at known frequencies to correct an initial relative range vector. Using the corrected range vector generated from the use of code, the method subsequently estimates a more precise correction by considering the carrier phase error as induced by ionospheric delay. This includes estimate the integer ambiguities on both the GPS signals and the crosslink signals iteratively and subsequently estimating a more precise ionospheric delay correction with is applied to the relative position vector using the carrier phase measurements. The method is also applicable to non-navigation applications including measuring dynamic ionospheric structure and variability over a wide range of scale sizes, thereby greatly improving operational models of navigation and communications, and improving interdependent models of atmospheric, ionospheric, magnetospheric, and space weather physics and prediction.

18 Claims, 5 Drawing Sheets

METHOD FOR USING GPS AND CROSSLINK SIGNALS TO CORRECT IONOSPHERIC ERRORS IN SPACE NAVIGATION SOLUTIONS

CROSS-REFERENCE TO RELATED APPLICATION

This application claims priority to a provisional application entitled "A Method for Using GPS and Crosslink Signals to Correct Ionospheric Errors" filed in the United States Patent and Trademark Office on Mar. 13, 2002 and assigned Application No. 60/363,805, the contents of which are incorporated herein by reference.

STATEMENT OF GOVERNMENTAL INTEREST

This invention was made with Government support under contract NAG5-8665 with the National Aeronautics and Space Administration. The Government has certain rights in this invention.

BACKGROUND OF THE INVENTION

1. Field of the Invention

The present invention relates generally to satellite communication and navigation and, in particular, to a method for utilizing GPS and crosslink signals in distributed spacecraft systems to correct for ionospheric errors in space navigation solutions.

2. Description of the Related Art

Distributed spacecraft systems (e.g. distributed satellite systems or spacecraft systems with some type of propulsion device) use multiple spacecraft to augment the capabilities of monolithic space system approaches. These systems, also referred to as formation flying systems, enable complex sensing tasks such as distributed aperture processing, co-observation, multipoint observation, and distributed interferometry, which are beyond the abilities of single spacecraft systems. Depending on the degree of inherent coordination, formation-flying systems differ from traditional satellite constellations in that the distributed system is treated as a whole, unified by common objectives. Both the National Aeronautics and Space Administration (NASA) and the Department of Defense (DoD) have identified distributed spacecraft systems as a means to achieve mission goals in future deployments. NASA, for example, has identified campaigns of several space missions that largely rely on multiple spacecraft deployments. Operationally, such systems are in their infancy.

A significant number of Earth and space science goals rely on the successful deployment and operation of distributed spacecraft technology within future operational missions. In conjunction with fundamental science, distributed spacecraft military missions in support of defense operations have been identified as important capabilities to maintain national interests.

The specific advantages attributed to the use of distributed spacecraft systems include increased capability, gradual performance degradation (as opposed to catastrophic failure) in that failure of one of the spacecraft does not render the system obsolete, improved system robustness, and overall long term cost efficiency. Relative to single spacecraft systems, formation-flying systems provide improved capability by spatially disbursing sensors, thereby supporting extended and adaptive baselines for distributed sensing tasks. This approach also supports temporal sampling at variable resolutions and is a systematic mechanism for implementing space-based multi-sensor data fusion systems. Because capability is distributed among multiple spacecraft such as satellites, re-deploying functioning spacecraft can mitigate failures that impact individual spacecraft. Thus, while performance in terms of resolution or coverage of a target area may be reduced due to diminished spacecraft, basic functionality is retained. Compensating for failures in this manner allows distributed spacecraft systems to realize an improved level of robustness beyond that of a single spacecraft approach. Finally, the goal of cost-efficiency is embodied in the fact that such formation flying systems rely on the collective faculties of multiple, individually limited spacecraft. This often necessitates the use of small, economical spacecraft approaches that can be deployed in clusters to reduce launch costs.

Realizing the advantages of distributed spacecraft systems, however, entails considerable complexity in system design and implementation. It is not simply by virtue of the fact that multiple spacecraft may be deployed that advantageous performance, capability, robustness, or cost efficiencies can be achieved. For coordinated formations, particularly autonomous or coherent distributed spacecraft systems, technologies and methodologies must provide mechanisms to support information exchange, coordination, autonomy, and dynamic adaptivity. The ability to realize such characteristics in a system must be greater than or commensurate with the level of coordination that is desired within the formation. For example a loosely coupled, non-coherent system may only require crosslink communications to exchange state information or support health and status sharing among spacecraft. Alternatively, a coherent system designed to act as a distributed aperture (e.g., a virtual spacecraft with distributed elements) would require a considerably higher level of distributed control, precision navigation, precision differential timing, and high-rate crosslink communications for coordination and science data exchange.

Supporting collective system operations, coordination, and science among distributed spacecraft necessitates functionality in navigation, communications, and control that leverage complex interactions among spacecraft and between spacecraft and the operating environment. A system that addresses these functions in an integrated, modular manner and that provides a structured approach to distributed spacecraft system design and implementation to effectively realize the advantages of such a system, has been disclosed in an application entitled "Integrated Navigation And Communication System For Use In Distributed Spacecraft Systems" filed by applicants on Jun. 14, 2002 in the United States Patent and Trademark Office and assigned Application Ser. No. 10/172,018, the contents of which are incorporated by reference herein.

Figure 1:
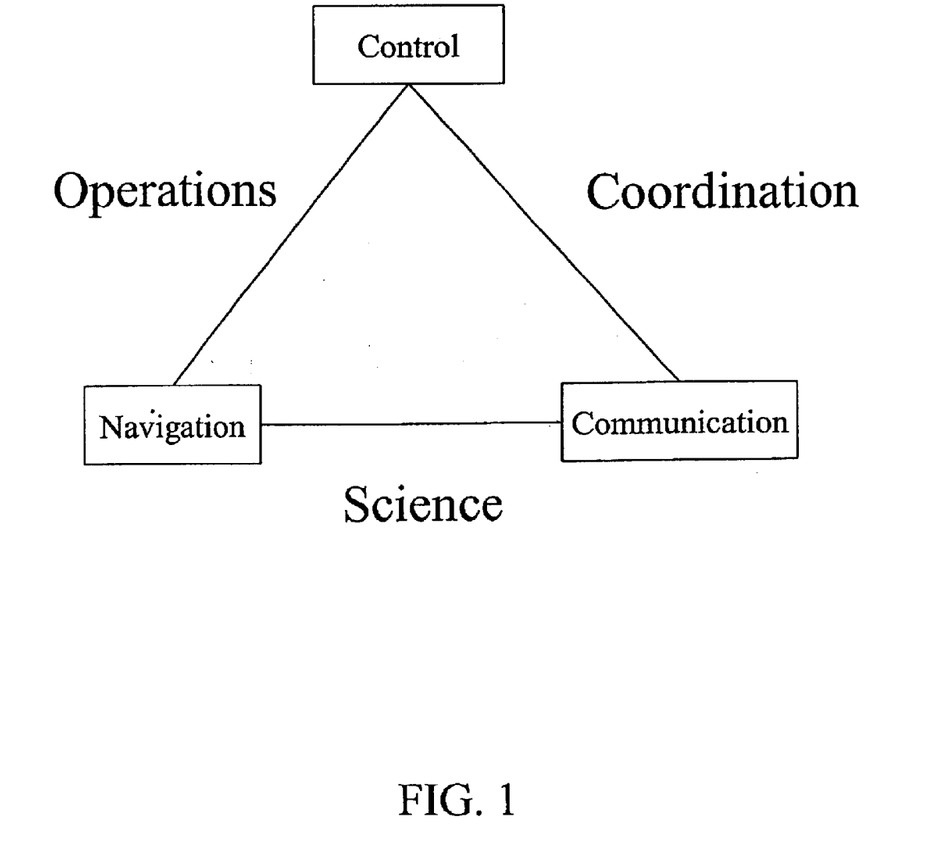
FIG. 1 is a conceptual model of an integrated navigation and communication system illustrating an interdependence of system functionality and the capabilities that those functions support.

FIG. 1 is a conceptual model of the integrated navigation and communication system illustrating the interdependence of system functionality and the capabilities that those functions support. The coordination of distributed autonomous systems such as formation flying spacecraft is typically defined as control in conjunction with communication among non-co-located spacecraft. Coordination is achieved by the perception of the system state and the identification of events that impact that system state. As a distributed system, coordination requires both local and global knowledge and thus communication of applicable information among spacecraft is vital. Control, in conjunction with navigation, forms the foundation for system operations needed to take advantage of the distribution of spacecraft.

Because a basic motivation for deploying distributed spacecraft systems is the ability to support and adapt the spatial dissemination of sensors, such systems require knowledge of spacecraft state as well as generated control actions to effect state changes. Performing scientific tasks also requires the ability to communicate information among spacecraft for on-board processing such as data alignment, data correlation, and data fusion.

Figure 2:
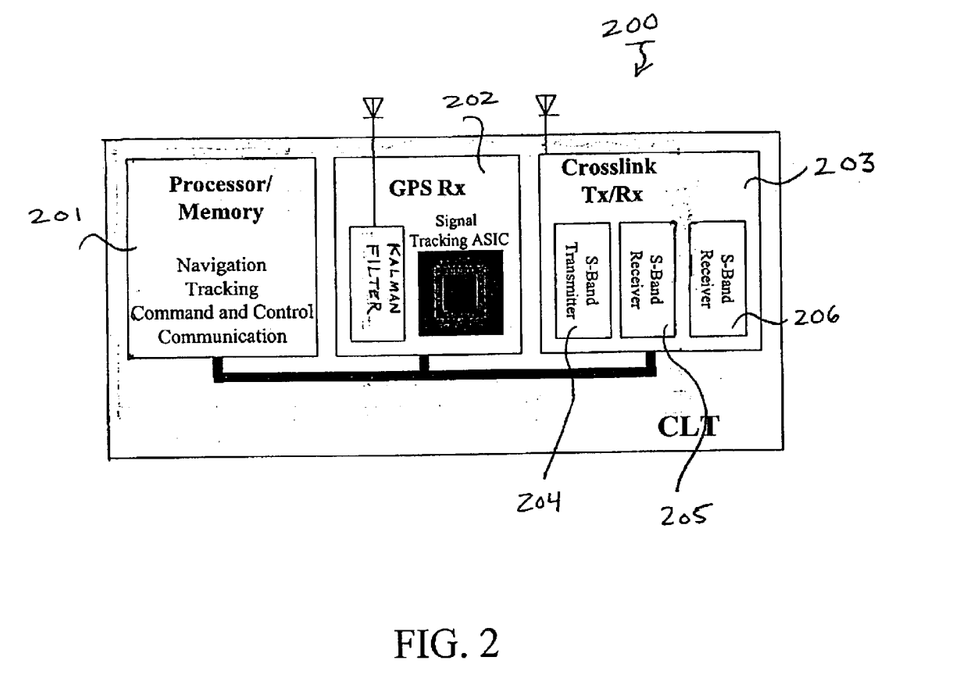
FIG. 2 is block diagram illustrating an integrated navigation and communication system for multiple distributed spacecraft flying in formation.

FIG. 2 is block diagram illustrating an integrated navigation and communication system 200 for multiple distributed spacecraft flying in formation, hereinafter referred to as a Crosslink Transceiver (CLT). As such, the CLT directly supports the implementation of the fundamental functions required to enable distributed spacecraft systems, including absolute and relative navigation, interspacecraft communications, and autonomous event detection for distributed command and control. Relative navigation, a fundamental measurement for data alignment and data correlation among distributed spacecraft, is determined through a variety of methods to support broad classes of formation flying missions. However, when performing relative navigation in a near-Earth environment, a primary error source is ionospheric distortion on ranging signals, which consequently induce errors in range and range rate estimates.

As stated above, ranging signals are significantly affected by their passage through the ionosphere. The ionosphere is a layer of the atmosphere at an elevation of 150–1,000 km that contains free electrons generated by ionizing radiation from the sun. The distribution and density of the free electrons at a given point in the ionosphere varies strongly with the time of day, the time of year, and the state of the solar sunspot cycle. There is also a significant unpredictable variation due to fluctuations in solar activity. The ionosphere can typically delay microwave signals from satellites by up to 100 ns. Time signals generated by GPS satellites are highly accurate and stable. Thus, a GPS receiver can potentially be used as a simple, low-cost local time standard. However, the unpredictability and variability of the ionospheric delay limits the accuracy and stability of the time that can be generated by a conventional GPS receiver.

GPS receivers exist that are capable of detecting microwave signals at both of the two widely separated frequencies, L1 and L2, transmitted by the GPS satellites. Currently, such receivers remove the effect of the ionospheric delay using the fact that the ionosphere imposes a group delay on the microwave signals that varies inversely with the square of the carrier frequency. However, the L2 ranging signal is currently encrypted and cannot easily be decoded by users who are not qualified by the United States Department of Defense. Some two-frequency receivers are available for non-qualified users, but they are considerably more expensive, and somewhat less reliable, than single-frequency receivers. Accordingly, many users have single-frequency receivers that can receive only the L1 signal.

Commonly, single-frequency receivers usually include a correction for the ionospheric delay based on an ionosphere model that is built into the GPS system. This model is expected to remove about 50% of the ionosphere effect, on average. Since the parameters of the model are estimated in advance and are then transmitted to the GPS satellites, they cannot anticipate day-to-day random fluctuations, and cannot be completely accurate. Alternatively, various organizations make detailed and accurate models of the ionosphere based on GPS observations. However, these models are not available simply, or in real-time.

Therefore, a need exists for a method of measuring the ionospheric delay of a signal transmitted through the ionosphere, enabling single-frequency GPS receivers and crosslink signals in distributed spacecraft systems to correct for ionospheric errors in space navigation solutions, specifically, for relative navigation.

SUMMARY OF THE INVENTION

It is, therefore, an object of the present invention to provide a method for utilizing GPS and crosslink signals in distributed spacecraft systems to correct for ionospheric errors in space navigation solutions, specifically, for relative navigation.

According to a first embodiment of the present invention, the above and other objects are achieved by a method for utilizing GPS and crosslink signals in a distributed spacecraft system having crosslink capabilities to correct for ionospheric errors for relative navigation using pseudorange measurements. The method comprises: obtaining a first GPS measurement set in a first spacecraft of the distributed spacecraft system from a GPS system; obtaining a second GPS measurement set in a second spacecraft of the distributed spacecraft system from the GPS system; computing a first relative range vector between the first and second spacecraft from the first and second GPS measurement sets; determining a second relative range between the first and second spacecraft from a crosslink signal between the first and second spacecraft; estimating a true scaled relative displacement of the first spacecraft with respect to the second spacecraft using a norm of the first relative range vector and the second relative range; and compensating the first relative range vector using a function of the true scaled relative displacement.

In a second embodiment of the present invention, the above and other objects are achieved by a method for utilizing GPS and crosslink signals in a distributed spacecraft system having crosslink capabilities to correct for ionospheric errors for relative navigation using carrier phase measurements. The method comprises: obtaining a first GPS measurement set in a first spacecraft of the distributed spacecraft system from a GPS system; determining a second GPS measurement set in a second spacecraft of the distributed spacecraft system from the GPS system; computing a first integer resolved relative range vector between the first and second spacecraft from the first and second GPS measurement sets; determining a second integer resolved relative range between the first and second spacecraft from an integer resolved crosslink signal between the first and second spacecraft; estimating a true scaled relative displacement of the first spacecraft with respect to the second spacecraft using a norm of the first integer resolved relative range vector and the second integer resolved relative range; and compensating the first integer resolved relative range vector using a function of the true scaled relative displacement.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE INVENTION

Preferred embodiments of the present invention will be described herein below with reference to the accompanying drawings. In the following detailed description, well-known functions or constructions are not described in detail as they would obscure the invention in unnecessary detail.

Referring to FIG. 2, in a standard configuration, a CLT 200 provides three core functions: processor/memory 201, GPS reception 202, and crosslink communications 203. The processor 201 supports signal acquisition and tracking, navigation, communications, and distributed command and control for spacecraft. A preferred component for the CLT's GPS reception 202 is a flight-qualified design based on the NASA Thermosphere Ionosphere Mesosphere Energetics and Dynamics (TIMED) GPS Navigation System (GNS), which provides autonomous orbit determination and navigation based on an extended Kalman filter. The third functional element of CLT 200 is the crosslink communications module 203, consisting of a crosslink transmitter 204 and multi-channel crosslink receiver. In FIG. 2, multi-channel crosslink receiving is accomplished by two receivers 205 and 206. Nominal crosslink frequencies are in S-band, however the design facilitates reconfiguration for alternative frequency bands.

Relative navigation solutions, a fundamental measurement for data alignment and data correlation among disbursed assets (i.e., distributed spacecraft), are determined by CLT 200 through a variety of methods supporting broad classes of missions. Depending on mission requirements, straightforward relative navigation solutions are generated by differencing filtered absolute GPS solutions. More rigorous requirements can be met through relative GPS Kalman filtering, both aided and unaided by crosslinks for performance enhancements (e.g., using the crosslink and GPS signals to estimate the local ionosphere), and through direct crosslink ranging. The latter methodology provides a solution for distributed spacecraft systems operating in deep space or otherwise beyond the GPS constellation. In this mode and without an external absolute reference, crosslink communication and ranging among distributed spacecraft supports determination of the formation's relative geometry modulo a rigid body rotation.

Building on the methods of short and long baseline relative navigation, the CLT crosslink capability of CLT 200 provides the means to estimate and disseminate navigation solutions through the communications connectivity that it supports. This includes the fact that the crosslink implementation provides multiple access capability using signal structures conducive to direct ranging and capable of supporting bandwidths sufficient to generate relative GPS solutions when applicable.

In addition, the S-band crosslink of CLT 200 can serve to mitigate measurement error sources found in distributed spacecraft systems that operate in the near Earth environment. This class of missions represents a significant majority of multiple spacecraft mission concepts. Unobservable biases in the front end of any transceiver used for ranging can introduce significant errors in a relative navigation solution. Using the self-tracking solution in which a transmitted signal is tracked by the transmitter through equivalent RF circuitry, the CLT can provide observability of front-end biases that can subsequently be used for direct crosslink range and range rate estimates. Operationally this can be accomplished in a pair-wise manner among distributed spacecraft by tracking and sharing unidirectional code and carrier phase measurements on CLT communication channels.

It should be noted here, that while the present invention will be described herein below with reference to a method for utilizing GPS and crosslink signals in distributed spacecraft systems to correct for ionospheric errors for relative navigation, it is also application to other space navigation solutions, as well as non-navigation signal correction and signal characterization.

As stated above, primary error source in the near-Earth environment is the ionospheric distortion on ranging signals that induce errors in range and range rate estimates. Under conditions in which single frequency GPS tracking is supported for relative navigation among spacecraft in close proximity, the CLT crosslink provides frequency diversity that can be used to compensate for ionospheric perturbations. Because the described technique is kinematic, it is robust, simple, and does not require dynamical models of interactions with inertial measurement units in the case of thrusted spacecraft.

Figure 3:
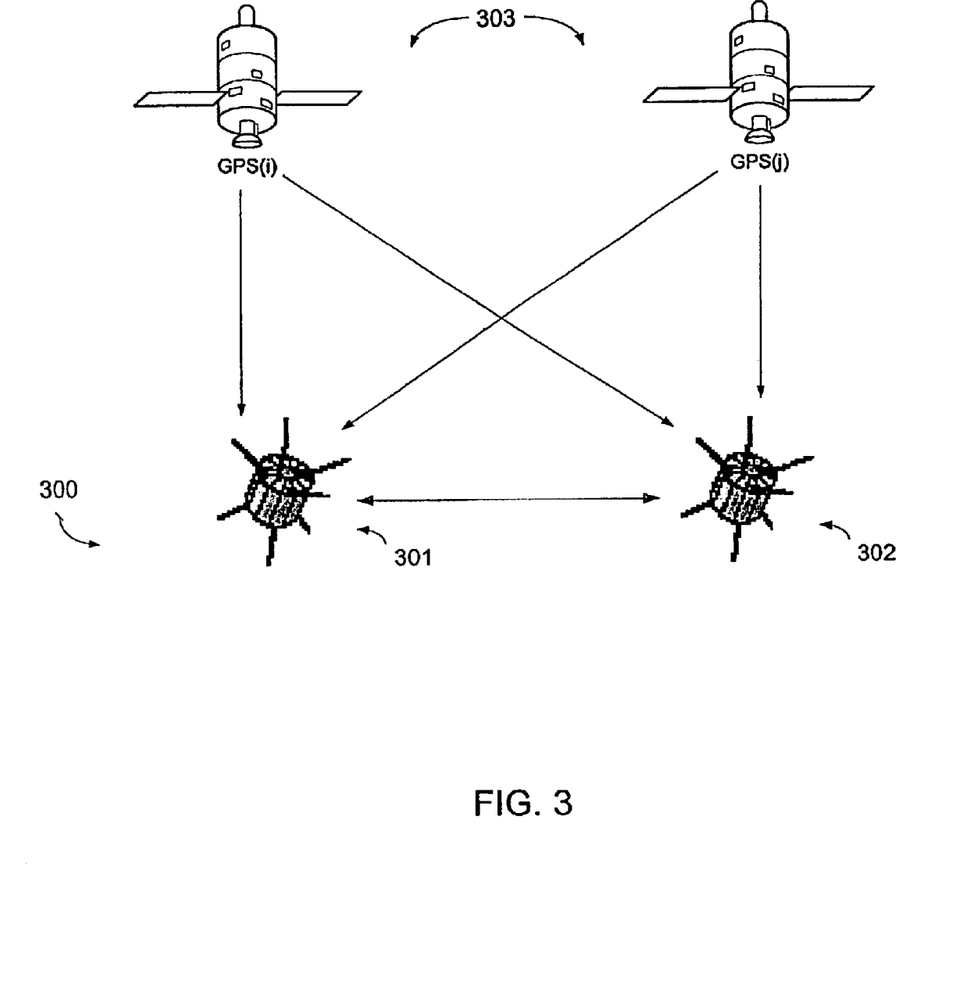
FIG. 3 is a diagram illustrating a general overview of a system to which the present invention is applied.

FIG. 3 is a diagram illustrating a general overview of a system to which the present invention is applied. Referring to FIG. 3, a distributed spacecraft system 300 includes a first spacecraft 301 and a second spacecraft 302. It should be noted that the distributed spacecraft system 300 may include more than two spacecraft; however, it will be described with only two herein below, for ease of explanation. Spacecraft 301 and 302 use crosslink signals to determine the relative range between the spacecraft 301 and the spacecraft 302 based on a crosslink ranging signal between the two. Both spacecraft 301 and 302 each include a single frequency GPS receiver for receiving GPS signals from a GPS satellite system 303. The GPS measurement sets received by both spacecraft 301 and 302 are then exchanged over the crosslink.

The method of the present invention compares a norm of the differential GPS solution (the norm of a relative range between the spacecraft 301 and the spacecraft 302) with the relative range between the spacecraft 301 and 302 derived from crosslink ranging operating at a distinct frequency, given the use of GPS code measurements (pseudorange measurements) to provide an acceptably accurate initial range measurement. It should be noted here that performance of this method is a function of the degree to which the electron density is essentially constant within a sphere containing the two spacecraft. Under these conditions the total effect of the ionosphere on the GPS-derived relative position solution is a pure stretch of the vector along its length, and therefore measurement compensation can be achieved. A total ionospheric error can be expressed as follows:

$$\|r_{1/2\,GPS}\| - r_{1/2\,XL} = \beta \|r_{1/2}^{true}\| \left( \frac{1}{f_{LI}^2} - \frac{1}{f_{XL}^2} \right) \qquad (1)$$

where $r_{1/2}^{true}$ is the true relative displacement of spacecraft 301 (spacecraft 1) with respect to spacecraft 302 (spacecraft 2), $r_{1/2XL}$ is scalar crosslink range (i.e., the relative range between spacecraft 301 and 302, determined from the crosslink ranging signals), $r_{1/2GPS}$ is a navigation solution vector (i.e., the differential range vector between spacecraft 301 and 302, determined from the GPS measurement sets received from the GPS system 303), $\beta$ is a constant, and $f_{L1}$ and $f_{XL}$ are the L1 GPS and S-band crosslink frequencies, respectively.

Equation (1) is solved for $$\beta \|r_{1/2}^{true}\|,$$

which, in an improved embodiment, can be smoothed using multiple code measurements, and the resulting quantity is used to compensate the GPS code-derived solution as follows:

$$r_{1/2\,GPS}^c = r_{1/2\,GPS} + \frac{\beta \|r_{1/2}^{true}\|}{f_{LI}^2}. \qquad (2)$$

A more detailed description will be given herein below with reference to FIG. 4.

Figure 4:
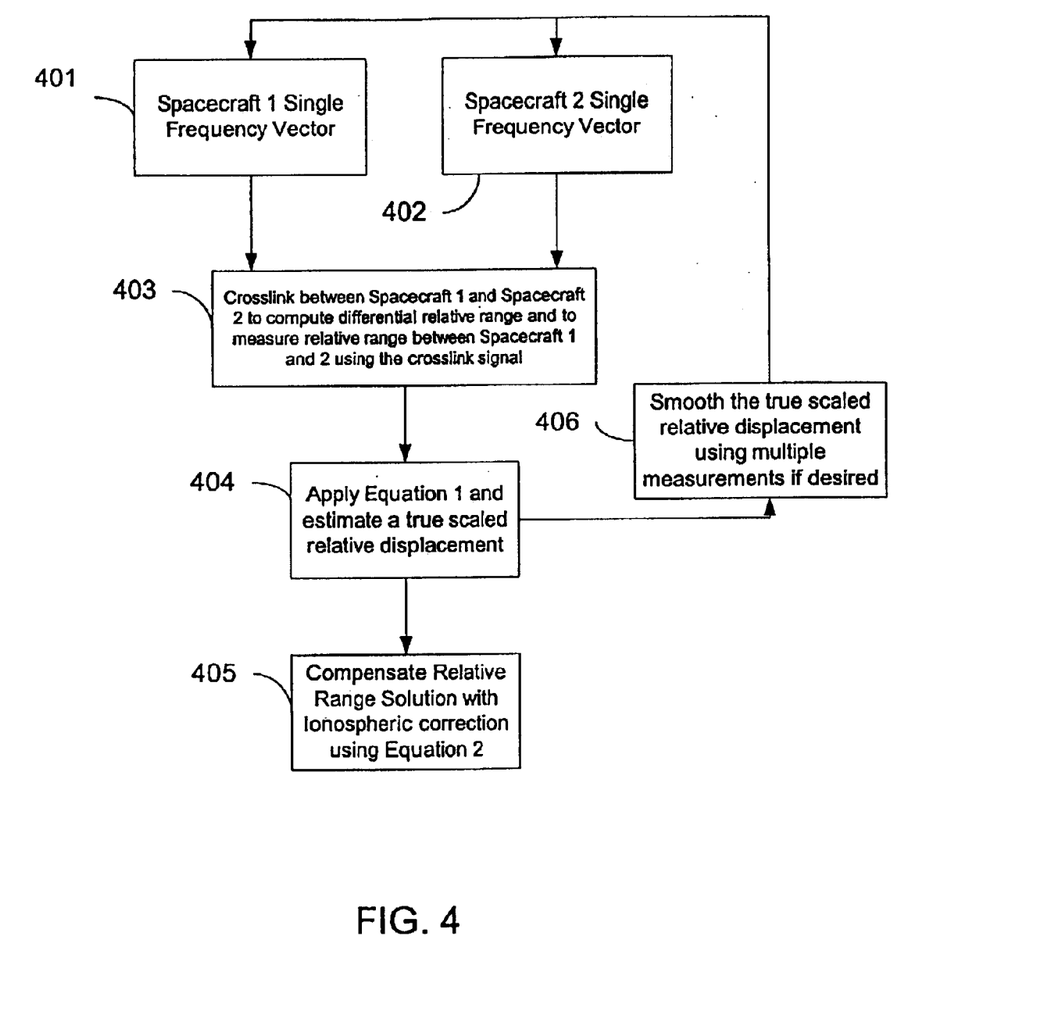
FIG. 4 is a flow chart illustrating a method of utilizing GPS and crosslink signals in distributed spacecraft systems to correct for ionospheric errors using pseudorange measurements according to a first embodiment of the present invention.

FIG. 4 is a flow chart illustrating a method of utilizing GPS and crosslink signals in distributed spacecraft systems to correct for ionospheric errors using pseudorange measurements according to a first embodiment of the present invention. In step 401, spacecraft 301 receives a single frequency GPS measurement set from the GPS system 303. At the same time, in step 402, spacecraft 302 receives a single frequency GPS measurement set from the GPS system 303. Spacecraft 301 and 302 then exchange GPS measurements to compute a differential (relative range) solution (i.e., the relative navigation solution vector) and to measure a relative range between spacecraft 301 and 302 using the crosslink signal (i.e., the scalar crosslink range), in step 403. In step 404, the true scaled relative displacement of spacecraft 301 and 302 is estimated using Equation 1 and a norm of the relative navigation solution vector and the scalar crosslink range determined in steps 401–403. In step 405, a compensated relative range solution, including the ionospheric correction, is determined using Equation 2.

Alternatively, if more exact measurements are required, the true relative displacement of spacecraft 301 and 302, which is determined in step 404, can be smoothed with multiple measurements in step 406.

An analogous method can be used to model carrier phase measurements, with the appropriate sign reversal required for phase delay versus group delay and the added complication of the need to resolve the integer ambiguity in the differential GPS solution. The integer ambiguity arises from the fact that carrier phase measurements provide observability of the portion of the received carrier wave that is received relative to a reference carrier frequency source. However, for navigation purposes, there is an ambiguous, integer number of carrier waves between a signal source (e.g., GPS satellite) and a receiver. To obtain an accurate navigation solution, this integer ambiguity must be resolved. This is typically achieved by a filtering process that produces a system of equations as a function of system geometry that provides a means to solve for the integer ambiguity. This applies to differential GPS solutions as well. Using the carrier phase measurements provides a more detailed analysis than when using the pseudorange measurements. If both the crosslink and GPS double difference integers are resolved, the expression $$\|r_{1/2\,GPS}\| - r_{1/2\,XL} = -\beta \|r_{1/2}^{true}\| \left( \frac{1}{f_{LI}^2} - \frac{1}{f_{XL}^2} \right), \qquad (3)$$

can be used to solve for an even more precise estimate of $$\beta \|r_{1/2}^{true}\|$$

because of the correspondingly reduced carrier measurement noise relative to the code measurement noise. A very precise relative navigation solution can then be obtained using $$r_{1/2\,GPS}^c = r_{1/2\,GPS} - \frac{\beta \|r_{1/2}^{true}\|}{f_{LI}^2}. \qquad (4)$$

Figure 5:
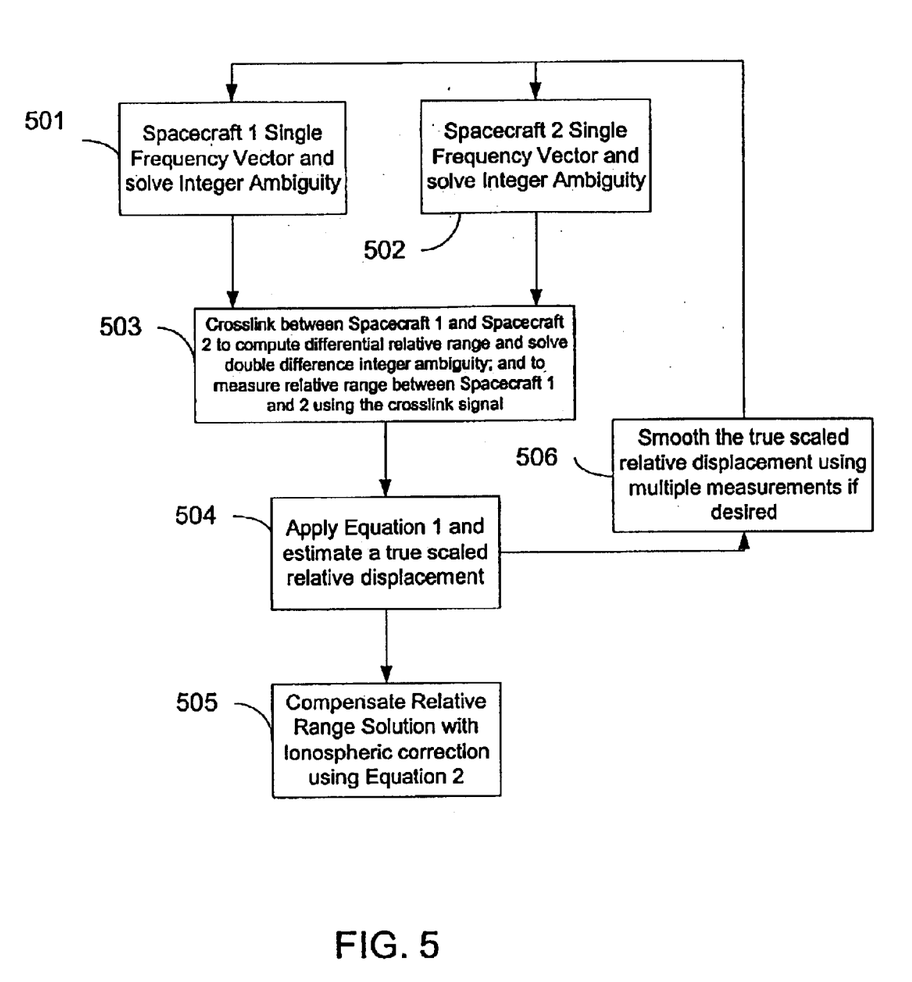
FIG. 5 is a flow chart illustrating a method of utilizing GPS and crosslink signals in distributed spacecraft systems to correct for ionospheric errors using carrier phase measurements according to a second embodiment of the present invention.

FIG. 5 is a flow chart illustrating a method of utilizing GPS and crosslink signals in distributed spacecraft systems to correct for ionospheric errors using carrier phase measurements according to a second embodiment of the present invention. In step 501, spacecraft 301 receives a single frequency GPS measurement set from the GPS system 303. At the same time, in step 502, spacecraft 302 receives a single frequency GPS measurement set from the GPS system 303. Spacecraft 301 and 302 then exchange GPS measurement sets to compute a differential (relative range) solution (i.e., an integer resolved relative navigation solution vector) and to measure an integer resolved relative range between spacecraft 301 and 302 using the integer resolved crosslink signal (i.e., the integer resolved scalar crosslink range), in step 503. In step 504, the true scaled relative displacement of spacecraft 301 and 302 is estimated using Equation 3 and a norm of the integer resolved relative navigation solution vector and the integer resolved scalar crosslink range determined in steps 501–503. In step 505, a compensated relative range solution, including the ionospheric correction, is determined using Equation 4.

Alternatively, if more exact measurements are required, the true relative displacement of spacecraft 301 and 302, which is determined in step 504, can be smoothed with multiple measurements in step 506.

When a new GPS satellite is introduced into the process due to system dynamics and the fact that receiver tracking is lost for setting GPS satellites and rising GPS satellites (with respect to the horizon) are acquired, new double difference integers can be estimated from $$N_i^{rel} = \text{round}\left( \nabla \Delta \phi_i - \frac{1}{\lambda}(1 - \beta \|r_{1/2}^{true}\|)(\hat{e}_i - \hat{e}_{ref})^T r_{1/2\,GPS}^c \right), \qquad (5)$$

where $\nabla \Delta \phi_i$ is the double difference carrier phase observable, $\hat{e}_i$ is the unit vector from the receiver to a general (i_th) GPS satellite, and $\hat{e}_{ref}$ is the unit vector from the receiver to a GPS satellite chosen as a reference for forming the double difference observables.

A proposed means to initialize lock on the relative integers involves batch processing ionosphere-compensated measurements from several widely separated epochs so that the relative geometry yields observability of the integers. The ionosphere compensation is derived from the pseudorange estimation process above.

While the present invention has been described above with reference to a distributed spacecraft system and relative navigation, those skilled in the art may also find the present invention applicable to measuring dynamic ionospheric structure and variability over a wide range of scale sizes. These new ionosphere measurements can then be used to map, model, and study the ionosphere, thereby greatly improving operational models of navigation and communications, and improving interdependent models of near earth regions including atmospheric, thermospheric, ionospheric, mesospheric, and magnetospheric regions by utilizing the true scaled relative displacement as a sample to model the near earth conditions, and space weather physics and prediction.

While the present invention has been shown and described with reference to preferred embodiments thereof, it will be understood by those skilled in the art that changes in form and details may be made therein without departing from the spirit and the invention as defined by the appended claims.

What is claimed is:

1. A method for utilizing GPS and crosslink signals in a distributed spacecraft system having crosslink capabilities to correct for ionospheric errors for relative navigation using pseudorange measurements, comprising:
   obtaining a first GPS measurement set in a first spacecraft of the distributed spacecraft system from a GPS system;
   obtaining a second GPS measurement set in a second spacecraft of the distributed spacecraft system from the GPS system;
   computing a first relative range vector between the first and second spacecraft from the first and second GPS measurement sets;
   determining a second relative range between the first and second spacecraft from a crosslink signal between the first and second spacecraft;
   estimating a true scaled relative displacement of the first spacecraft with respect to the second spacecraft using a norm of the first relative range vector and the second relative range; and
   compensating the first relative range vector using a function of the true scaled relative displacement.

2. The method of claim 1, further comprising the step of smoothing the true relative displacement by averaging multiple measurements of the true relative displacement.

3. The method of claim 1, wherein the step of estimating the true scaled relative displacement of the first spacecraft with respect to the second spacecraft using the norm of the first relative range vector and the second relative range, is performed according to $$\|r_{1/2\,GPS}\| - r_{1/2\,XL} = \beta\|r_{1/2}^{true}\|\left(\frac{1}{f_{L1}^2} - \frac{1}{f_{XL}^2}\right),$$

where $$r_{1/2}^{true}$$

is the true relative displacement of the first spacecraft with respect to the second spacecraft, $r_{1/2XL}$ is the second relative range, $r_{1/2GPS}$ is the first relative range, $\beta$ is a constant, $f_{L1}$ is a GPS frequency, and $f_{XL}$ is an S-band crosslink frequency.

4. The method of claim 1, wherein the step of compensating the first relative range vector using the true relative displacement, is performed according to $$r_{1/2GPS}^c = r_{1/2GPS} + \frac{\beta\|r_{1/2}^{true}\|}{f_{L1}^2},$$

where $$r_{1/2}^{true}$$

is the true relative displacement of the first spacecraft with respect to the second spacecraft, $r_{1/2GPS}$ is the first relative range, $\beta$ is a constant, $f_{L1}$ is a GPS frequency, and $r_{1/2GPS}^c$ is the compensated first relative range vector.

5. The method of claim 1, wherein the first and second GPS measurement sets are exchanged between the first and second spacecraft using the crosslink signal.

6. A method for utilizing GPS and crosslink signals in a distributed spacecraft system having crosslink capabilities to correct for ionospheric errors for relative navigation using carrier phase measurements, comprising:
   obtaining a first GPS measurement set in a first spacecraft of the distributed spacecraft system from a GPS system;
   obtaining a second GPS measurement set in a second spacecraft of the distributed spacecraft system from the GPS system;
   computing a first, integer resolved relative range vector between the first and second spacecraft from the first and second GPS measurement sets;
   determining a second integer resolved relative range between the first and second spacecraft from an integer resolved crosslink signal between the first and second spacecraft;
   estimating a true scaled relative displacement of the first spacecraft with respect to the second spacecraft using a norm of the first integer resolved relative range vector and the second integer resolved relative range; and
   compensating the first integer resolved relative range vector using a function of the true scaled relative displacement.

7. The method of claim 6, further comprising the step of smoothing the true relative displacement by averaging multiple measurements of the true relative displacement.

8. The method of claim 6, wherein the step of estimating the true scaled relative displacement of the first spacecraft with respect to the second spacecraft using the norm of the first integer resolved relative range vector and the second integer resolved relative range, is performed according to $$\|r_{1/2GPS}\| - r_{1/2XL} = -\beta\|r_{1/2}^{true}\|\left(\frac{1}{f_{L1}^2} - \frac{1}{f_{XL}^2}\right),$$

where $$r_{1/2}^{true}$$

is the true relative displacement of the first spacecraft with respect to the second spacecraft, $r_{1/2XL}$ is the second relative range, $r_{1/2GPS}$ is the first relative range, $\beta$ is a constant, $f_{L1}$ is a GPS frequency, and $f_{XL}$ is an S-band crosslink frequency.

9. The method of claim 6, wherein the step of compensating the first integer resolved relative range vector using the function of the true relative displacement, is performed according to $$r_{1/2GPS}^c = r_{1/2GPS} - \frac{\beta \| r_{1/2}^{true} \|}{f_{L1}^2}$$

where $$r_{1/2}^{true}$$

is the true relative displacement of the first spacecraft with respect to the second spacecraft, $r_{1/2GPS}$ is the first relative range, $\beta$ is a constant, $f_{L1}$ is a GPS frequency, and $r_{1/2GPS}^c$ is the compensated first relative range vector.

10. The method of claim 6, wherein the first and second GPS measurement sets are exchanged between the first and second spacecraft using the integer resolved crosslink signal.

11. The method of claim 6, further comprising the step of solving for a new double difference integer when an additional GPS satellite is providing additional GPS signals from the GPS system to the first and second spacecraft.

12. The method of claim 11, wherein the new double difference integers are solved according to $$N_i^{rel} = \text{round}\left( \nabla \Delta \phi_i - \frac{1}{\lambda}(1 - \beta \| r_{1/2}^{true} \|)(\hat{e}_i - \hat{e}_{ref})^T r_{1/2GPS}^c \right)$$

where $N_i^{rel}$ is the double differenced integer relative to a general (i_th) GPS satellite, $\nabla \Delta \phi_i$ is the double difference carrier phase observable $\hat{e}_i$ is a unit vector from the receiver to a general (i_th) GPS satellite, and $\hat{e}_{ref}$ is a unit vector from the first spacecraft to a reference GPS satellite chosen as a reference for forming double difference observables.

13. A method for utilizing GPS and crosslink signals in a distributed spacecraft system having crosslink capabilities to study near earth conditions for various scientific applications, comprising:
   obtaining a first GPS measurement set in a first spacecraft of the distributed spacecraft system from a GPS system;
   obtaining a second GPS measurement set in a second spacecraft of the distributed spacecraft system from the GPS system;
   computing a first relative range vector between the first and second spacecraft from the first and second GPS measurement sets;
   determining a second relative range between the first and second spacecraft from a crosslink signal between the first and second spacecraft;
   estimating a true scaled relative displacement of the first spacecraft with respect to the second spacecraft using a norm of the first relative range vector and the second relative range; and
   utilizing the true scaled relative displacement as a sample to model the near earth conditions.

14. The method of claim 13, further comprising the step of smoothing the true relative displacement by averaging multiple measurements of the true relative displacement.

15. The method of claim 13, wherein the step of estimating the true scaled relative displacement of the first spacecraft with respect to the second spacecraft using the norm of the first relative range vector and the second relative range, is performed according to $$\| r_{1/2GPS} \| - r_{1/2XL} = \beta \| r_{1/2}^{true} \| \left( \frac{1}{f_{L1}^2} - \frac{1}{f_{XL}^2} \right),$$

where $$r_{1/2}^{true}$$

is the true relative displacement of the first spacecraft with respect to the second spacecraft, $r_{1/2XL}$ is the second relative range, $r_{1/2GPS}$ is the first relative range, $\beta$ is a constant, $f_{L1}$ is a GPS frequency, and $f_{XL}$ is an S-band crosslink frequency.

16. The method of claim 13, wherein the first and second GPS measurement sets are exchanged between the first and second spacecraft using the crosslink signal.

17. The method of claim 13 wherein the various scientific applications comprise at least one of navigation modeling, communications modeling, and space weather physics and prediction.

18. The method of claim 13 wherein the near earth conditions comprise at least one of atmospheric, thermospheric, ionospheric, mesospheric, and magnetospheric regions.

* * * * *